United States Patent [19]
Richter

[11] 3,949,958
[45] Apr. 13, 1976

[54] PITCH CONTROL SYSTEM

[75] Inventor: Heinz K. Richter, Los Angeles, Calif.

[73] Assignee: Lockheed Aircraft Corporation, Burbank, Calif.

[22] Filed: Dec. 7, 1973

[21] Appl. No.: 422,516

[52] U.S. Cl.................. 244/83 R; 244/84; 244/87
[51] Int. Cl.²......................................... B64C 13/12
[58] Field of Search ........ 244/75 R, 76 R, 77 F, 78, 244/82, 84, 83 R, 87, 85, 42 DA, 83 G, 83 J; 114/126, 66.5 H

[56] References Cited
UNITED STATES PATENTS

| | | | |
|---|---|---|---|
| 1,574,567 | 2/1926 | Flettner | 244/42 DA |
| 2,613,891 | 10/1952 | Knight | 244/87 |
| 3,109,614 | 11/1963 | Steidl | 244/87 |
| 3,207,458 | 9/1965 | Kean | 244/87 |
| 3,409,251 | 11/1968 | Lawson et al. | 244/77 F |

*Primary Examiner*—Trygve M. Blix
*Assistant Examiner*—Barry L. Kelmachter
*Attorney, Agent, or Firm*—Billy G. Corber; William Kovensky; Ralph M. Flygare

[57] ABSTRACT

An improved system of pitch control for aircraft having a "flying tail"; i.e., a movable horizontal stabilizer with at least one movable elevator thereon. The human or automatic pilot input commands operate the elevators, and then the elevator response is used as part of the command to operate the stabilizer.

4 Claims, 1 Drawing Figure

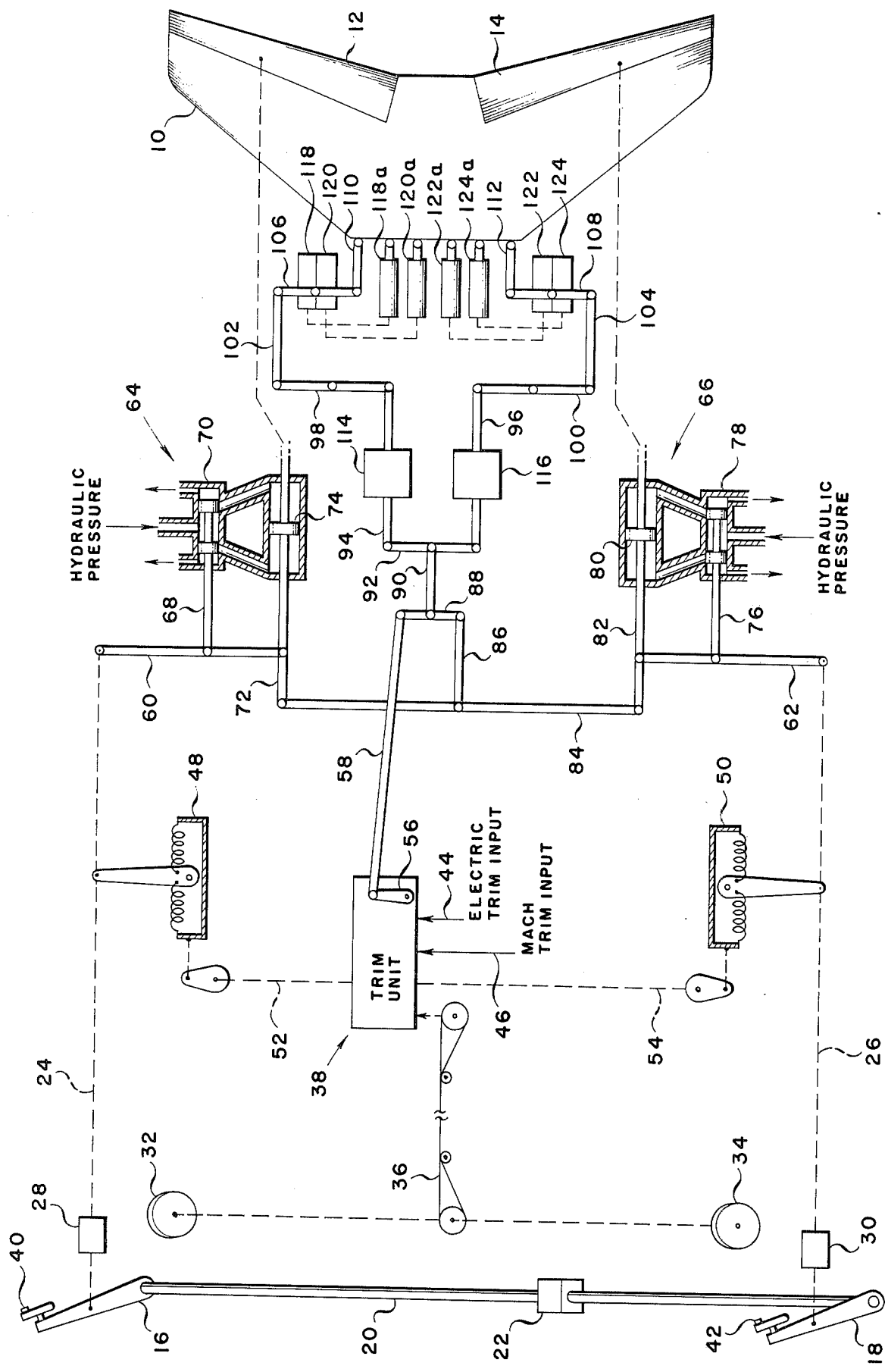

PITCH CONTROL SYSTEM

The invention specifically relates to an improved aircraft pitch control system.

The "flying tail", a movable horizontal stabilizer having at least one movable elevator thereon for pitch control, particularly in large aircraft, is known. Usually, the one or more elevator, frequently operated or boosted by a separate power control system, is used for maneuvering control, and the horizontal stabilizer is used to control the trim of the aircraft. Changing trim is accomplished by adjusting the stabilizer angle relative to the fuselage. A jack-screw actuator is often used to move the stabilizer. In order to provide the necessary safety factors in the event of a failure in the elevator or trim control system, these prior aircraft often required overdesign in both the elevator and stabilizer control systems, which was undesirable because of the corresponding additional weight and cost.

Another prior control approach is to use the stabilizer for both maneuvering and trim. Elevators have been used to increase the effective horizontal tail surface, and to reduce the total system weight. Such elevators are linked directly to the fuselage and thus their deflection is produced by the relative motion of the horizontal stabilizer with respect to the fuselage. This system has a number of advantages, including the ability to overcome mis-trim, even on takeoff, by simply pulling the control stick. Another advantage is that piston rather than jack-screw actuators are used to operate the horizontal stabilizer, and the piston type is preferable from the viewpoints of reliability and response to input commands. However, this general approach depends solely upon movement of the stabilizer for all pitch control, and therefore, again, extensive overdesign and structural redundancy as to the stabilizer must be provided to achieve safe operation.

The fundamental approach of the present invention is a radical departure in the field of "flying tails" for pitch control in aircraft. The invention provides means whereby the pilot input commands, via independent control systems and power servos, operates the elevator or elevators directly. The stabilizer is also operated from the pilot's inputs, but via trim and independently of the elevator.

The invention "flying tail" is controlled in the normal manner by the human pilot, or by the automatic pilot if available on a particular aircraft. Thus, the terms "pilot's inputs", or "input control signals", or "input commands", and similar terms, as used in the specification and claims herein shall be understood to include all of such primary control inputs, usually from the human or automatic pilot. Further, the word "tail" may be used from time-to-time herein in place of the proper name "horizontal stabilizer" for simplicity.

The invention provides many parallel control paths with a minimum of structural redundancy. If either elevator fails the other elevator and the stabilizer can be used to control the aircraft; if both elevators or the sole elevator fails, the stabilizer is available, and if the stabilizer fails the elevators are available. It is thought that an aircraft could be brought safely to ground from the final approach path on just one elevator in the event of massive damage. The invention thus achieves the advantages of reduced redundancy, lighter weight, and a lower cost control system, and most importantly, also achieves improved safety and reliability.

The invention provides improved functional redundancy with reduced structural redundancy. That is, the invention provides several alternate paths for the pilot's commands to at least one of the control surfaces. Logically, these paths can be thought of as forming a pyramid like structure from the apex (controlling point) to the base (controlled point). With simple structural redundancy there are separate parallel paths from the controlling point to the controlled point.

An important advantage is the ability to permit the pilot to control the aircraft after a jam or failure with no interruption; i.e., the invention does not impose a requirement to perform even a single preparatory act. Thus, the invention assures continuous pitch control even after a control system failure. Heretofore, in the event of a control system jam or failure, warning devices, such as bells, lights, or the like, were actuated, and the pilot had to be trained to do something; pull a lever, or push a button, or pull a cable, or the like, to cut out the inoperative system. He would thereafter use a redundant system or a parallel system, such as the trim, to control the aircraft. Further, these preparatory acts often had to be done immediately as the aircraft might literally be out of control until the jam was cut out. The requirement that the pilot divert his attention from controlling the aircraft, do some acts, and then resume control, is a serious disadvantage for the reasons that the speed of human response can be critical, time to do the acts is required, and there is a potential of human error in performing or in failing to perform the preparatory acts. Even if the entire series of events is performed as planned, still some time must be lost to the performance. A human error anywhere in the necessary chain of events and/or the lost time could be sufficient to compound the control failure and cause a disaster.

With the present invention the pilot need take no action and will not interrupt his controlling the aircraft, since the system automatically ignores the inoperative part of the system and leaves controllability in the remaining operative parts. This is an enormously important advantage, as pointed out above. Of course, the invention can and probably would be used with conventional warning lights, horns, etc., but the critical difference is that the pilot need not take any immediate action or otherwise divert his attention, and can safely continue to land the aircraft without interruption. The jam or failure can thereafter be corrected at leisure on the ground.

The invention system uses the independently powered elevator or elevators as the primary pitch control, and the independently powered stabilizer as the trim control. The invention comprises a linkage system including means to crossfeed input commands to both the stabilizer and the elevators. This crossfeed feature, during normal operation, provides the most efficient combination of motion of the elevators and the stabilizer. The ratio of motions between these control surfaces as well as the threshold of stabilizer response to elevator motion is easily adjusted for a particular aircraft and/or for particular desired performance characteristics by simple adjustments of the linkages. The trim unit combines manual, electrical, and Mach trim inputs, and aids in this crossfeed control.

The invention provides a generally smaller and lighter weight empennage, while at the same time providing improved control. Another advantage of the invention is that it maintains the usual fine trim control capability on the tail. The invention also provides parallel independent elevator control systems including separate cable systems, feel systems, power servos, automatic pilot servos, override bungees and manual mechanical disconnects in each cable system to thereby provide complete flexibility. For added safety, redundancy is provided for all actuators.

The invention provides a choice for the designer as to feedback of control inputs to the pilot's control stick. That is, an input at the trim wheel directly to the tail can be made to cause or can be made to not cause a corresponding motion of the pilot's control stick. The invention is equally applicable either way, the choice will probably be based upon usage and/or pilot preference in a particular environment.

The elevators are hinged to the tail, but they can be driven from actuators anchored at either the fuselage or the tail, the choice being dependent upon various considerations about the particular airplane in question, as is known to those skilled in the art.

The invention can operate in one of two forms; i.e., where the elevators stay at the same relative position to the tail as the tail moves, or where tail motion produces additional simultaneous elevator motion. It is preferred to use known non-linear response linkages to thereby obtain a mixture of these two approaches. Thus, when cruising, a relatively large amount of pilot input on the control stick will produce relatively little elevator motion to thereby decrease the sensitivity of the pitch control during cruise to simplify flying the aircraft. Such linkages can be located either "before" or "after" the elevator servos. However, the elevator servo actuators do cause motion of the entire horizontal stabilizer in direct relation to stick when cruising.

The invention has the additional advantages of retention of all prior safety features, piston type actuators throughout, full control power on the unjammed portions of the system without emergency procedures, while at the same time providing greatly enhanced safety with reduced system complexity and cost.

The sole FIGURE is a diagrammatic representation of an invention control system embodied in an aircraft.

Reference numeral 10 designates a horizontal stabilizer or tail which carries a pair of elevators 12 and 14. The invention is particularly useful on relatively large aircraft in which both the tail and the elevators are movable control surfaces; i.e., aircraft having a so-called "flying tail", as well as with aircraft having only one elevator.

The left side of the drawing represents the flight station containing the dual pilot controls comprising a pair of control columns or "sticks" 16 and 18 conventionally interconnected, as represented by rod 20. Rod 20 contains means 22 to disconnect the control columns 16 and 18 from each other either automatically upon jamming of one side as with the use of a bungee, or with the use of manual disconnect means. Both these means could be used and are represented by block 22. As is well known, a bungee is a device which normally functions like a rigid link, but which, in fact, contains a spring force which yields in the event of a jam in one of the two linkages interconnected by the bungee. Thus, the bungee, together with its associated logic and/or electrical devices if any, can act to "cut out" the frozen or otherwise inoperative linkages, leaving the remaining good linkage unimpaired for use in controlling the aircraft. Various types of bungees are known and are commercially available. For example, linear or rotary types could be used. Thus, the word "bungee" and the like as used in the specification and claims herein shall be understood to include suitable bungee means to function as set forth above, as well as other functionally equivalent devices.

The control columns 16 and 18 are connected to the remaining linkage by a pair of conventional control cable systems 24 and 26. These control cables include bungees 28 and 30 respectively. The flight deck also comprises dual manual trim wheels 32 and 34 which provide the input to a mechanical trim cable system 36 which interconnects these trim wheels to a composite trim unit 38. Each control column 16 and 18 includes a button or the like 40 and 42 used to control conventional electrical means to provide trim input, indicated by arrow 44, into composite trim unit 38. Arrow 46 represents Mach trim input which is provided from the Mach sensor. As is well known, the Mach trim unit which produces the Mach trim input is an automatic device which compensates for the tendency of the center of lift of the aircraft to move aft as the aircraft travels in transonic speed. That is, when the aircraft is traveling at about 0.92 Mach, it has a tendency to nose down, and the Mach compensator automatically corrects this to maintain the airplane in level flight.

Means are provided to put "feel" on the two cable systems 24 and 26 in the conventional manner. To this end there are provided a pair of feel units 48 and 50. These units are interconnected to the trim unit 38 by a pair of two-way linkages 52 and 54, respectively. These linkages 52 and 54, together with feel units 48 and 50, also serve to crossfeed trim control into elevator control on links 60 and 62, as will be set forth in more detail below.

Trim unit 38 represents a well developed component in present day aircraft. It sums up all the various inputs (viz., the mechanical trim wheel inputs, the optional electric trim input, and the Mach trim input) and produces an output on its crank 56 which drives a link 58 in accordance with the inputs and predetermined "logic" in the unit which may be in the form of gear ratios, or the like. A suitable device of this type, capable of combining (summing) mechanical and/or electrical inputs and producing a mechanical shaft rotation output is disclosed in U.S. Pat. No. 1,765,583 to Henderson, entitled "Automatic Control of the Steering of Dirigible Craft." U.S. Pat. No. 3,095,168 to Treadwell et al, and U.S. Pat. No. 2,620,463 to Merideth, similarly show reduction gearing means for a summing electrical input signals and mechanical forces to provide a mechanical force for stabilization of steering controls. While trim units differ from one aircraft to another, the invention uses state-of-the-art devices of the aforementioned types only; i.e., no conceptual change as to the composite trim unit is required.

The overall underlying concept of the invention is to utilize the pilot commands to first control the elevator or elevators, and to then use the resultant motion thereof as another input to control the tail. Thus, the tail moves in accordance with elevator motion, certain predetermined logic contained within the interconnecting linkages described further below, and with the normal input commands to the tail.

The invention linkage is of generally parallel configuration, along the left and right sides, although there are certain points of commonality which will be pointed out below. The pilot commands contained on link 58 and cables 24 and 26 operate the invention linkage as follows. Cable systems 24 and 26 operate links 60 and 62, respectively. A pair of conventional elevator servos 64 and 66 are provided. These servos are the means which drive the elevators. Link 60 is connected at an intermediate point to a link 68 which operates the control valve 70 of servo 64. The other end of link 60 is connected to a link 72 which carries the actuator or main power piston 74 of servo 64. Piston 74 via link 72 operates elevator 12 in a direct mechanical manner. A dotted line is shown for the part of link 72 where it connects to elevator 12 in order to indicate that the elevator is insensitive to stabilizer motion. That is, this linkage, (dotted line 102), is such that elevator motion caused by stabilizer motion is negligible. The principles of designing such a linkage to accomplish this desideratum are well-known. Similarly, the elevator servos could be anchored on either the tail or the airframe, depending upon the particular aircraft design. A similar and parallel arrangement is provided for elevator 14 and servo 66. These parts comprise a link 76 which operates the servo control valve 78 which in turn controls the piston 80 on a link 82 which actuates elevator 14.

As is well known, a servo is a kind of hydraulic relay or pressure multiplier. It utilizes relatively small motions of its control valve to control the input pressure to the actuator to thereby generate a relatively much larger control force. The arrows on the drawing indicate suitable connections to a conventional hydraulic fluid supply and returns. The servos themselves are conventional, and units will be provided for redundancy, and need not be described in any greater detail herein.

The invention makes it appear to the pilot that he is controlling the tail directly. He is not conscious of the fact that he is controlling the tail indirectly in accordance with the invention by first driving the elevators which in turn drive the tail. This is so because present aircraft servos are so quick that a pilot cannot detect the difference in performance time between the cascade type control scheme used by the invention and prior systems which drive the tail directly. It is thought that this time difference would be on the order of 10 to 20 milliseconds. Such a period of time is negligible with respect to aircraft response time.

A link 84 interconnects the ends of the elevator actuator linkages 72 and 82. A floating link 86 interconnects link 84 at about its center point with a cross link 88 which interconnects the other end of link 86 with link 58 from the trim unit 38. The lengths of crank 56 and of link 88, among others, can be adjusted to obtain the flexibility as to ratios and thresholds referred to above for elevator/stabilizer motion.

Drive link 90 interconnects the mid-point of cross link 88 with the mid-point of a similar cross link 92. Beyond link 92 there is provided a parallel redundant linkage to tail 10. To this end, there is provided a pair of links 94 and 96 each of which drives an intermediate link 98 and 100, pivoted to the airframe at about their mid-points as shown, each of which in turn drives another link 102, 104. Links 102 and 104 in turn each drive a servo control valve package 106 and 108, each of which in turn is connected to a feedback link 110 and 112 connected to tail 10. The "links" 106 and 108, as is conventional in this art, each represent a linkage system which serves to sum up the input and the feedback to the tail to thereby produce a command motion to the control valves of the stabilizer servos. Links 94 and 96 each contain a bungee 114 and 116 which serve to cut out one or the other of the parallel linkages at either end of cross link 92 in the event of a jam on one side or the other. The tail proper is thus redundantly servo actuated or driven.

Each side of the linkage operates two servo valves, and any one of the four servos is sufficient to drive the tail 10. A servo 118 operates its acutator 118a in the manner indicated by the dotted line. That is, the drawing represents the arrangement wherein linkage 106 operates the valve of servo 118 (equivalent to valve 70 of servo 64), and the actuator of that servo 118 operates the tail 10. The other three servos 120, 122 and 124 and their actuators are arranged in a similar manner, as indicated in the drawing, to drive the tail.

The fact that link 86 "floats" is important in obtaining the safety advantages of the present invention. For example, assume that there is a jam somewhere in the linkage associated with one or two of the starboard side tail servos 118 and 120, and that this jam occurs at a critical time such as take-off or landing. In such case, the pilot can ignore the various automatic devices which would be alerting him to the jam and its location, and he can continue his landing or take-off using only the elevators. During this time, any trim commands are harmlessly absorbed by bungees 114 and 116. Later, on the ground or at cruise or a safe altitude, he can take the necessary action to operate bungee 114 to "cut out" the jammed linkage, and control of the tail will proceed through links 96, 100, etc., to the servos 122 and 124. These desiderata will have been obtained because of the ability of link 86 to pivot at its connection to links 84 and 88 to pass on the control outputs on link 58 to the control surface. That is, the pilot commands which were operating the elevator servos 64 and 66 now also feed back via link 86 to the operating side of the linkage and thence to the tail 10. In the event of a fault in one of the elevator actuator linkages, the associated bungee or the like 28 or 30 will operate, and the one remaining elevator will operate, and this control input will also operate the tail via links 86, 88, 90, 92 and all of the remaining operative linkage thereafter to tail 10.

Link 86 in effect sums the outputs from the two servo actuators 74 and 80, and if one of these outputs is not present, as would be the case in the event of a jam, link 86 still provides the required imput to the tail actuators. If link 72 is jammed, then link 82 would move link 86 around the pivot between links 84 to 72. In such case link 86 would move a shorter distance than it would if links 72 and 82 moved together as normally. This is simply compensated for with added trim input. In a similar manner cross link 88 sums the inputs from link 86 and the trim unit link 58, and it is this arrangement of multiplied or pyramided inputs which provides the large number of separate, alternate and independent paths from the flight deck to at least one or more of the three control surfaces to permit safely controlling the pitch of the aircraft under virtually all conditions of linkage failure. It would require at least two separate and unrelated failures to totally disable the invention pitch control system. Each trim output on link 58, via links 86, 88 and 90, will cause direct tail motion plus some combination of elevator and tail motion. The tail and elevator motions are not produced entirely directly from the motion of link 58, but rather are caused by the feedback of the trim output to the feel units 48 and 50, which in turn causes motion of the links 60 and 62. Thus, considered directly, trim commands on link 58 cause motion of only tail 10. It is the input, whichever one or combination of various trim inputs, to the trim unit 38 via the feel units 48 and 50, which causes concurrent motion of the elevators with the tail. If the feel units were not connected to the trim unit in a particular aircraft, then the trim would produce only stabilizer motion and no elevator motion.

It is this arrangement of links which permits the obtaining of relatively large tail motion through the trim with bypassing of the invention's elevator feedback feature. It is old art to build trim units 38 to accomplish predetermined performance characteristics.

In its broadest scope the invention is useful in any aircraft or other environment having at least two control surfaces with means to input commands to each surface. The invention comprises means to use the motion of the first surface in addition to the second surface's normal commands to control the motion of the second surface. As used herein, the phrase, "one control surface" or the like could be actually more than one surface, such as the two elevators 12 and 14. The point to be borne in mind is that the invention has broader utility than use on aircraft having "flying tails". For example, the invention could be used on a flying wing aircraft; i.e., an aircraft shaped like a wing and not having a conventional fuselage or empennage, in which case the control surfaces, called "elevons", function to control both pitch and roll. The invention could also be used in other unusual aircraft, or in other vehicles such as hydrofoil ships, and in other vehicles and other environments.

While the invention has been described in detail above, it is to be understood that this detailed description is by way of example only, and the protection granted is to be limited only within the spirit of the invention and the scope of the following claims.

I claim:

1. An aircraft having at least one elevator and a horizontal stabilizer;

first drive means for displacing said elevator;

first control means to control said first drive means;

second drive means for displacing said horizontal stabilizer;

second control means to control said second drive means;

means to input displacement commands to said first and second control means;

linkage means interconnecting the output of said first drive means with the input of said second control means;

a selectively controllable trim unit on said aircraft;

means to connect the output motion of said trim unit to said linkage means between the output of said first drive means and the input of said second control means;

a flight deck control column;

a control cable system interconnecting the output of said control column with the input of said first control means;

a feel unit on said cable control system; and means to feed back the motion obtained from said feel unit as an input to said trim unit.

2. The combination of claim 1, wherein said aircraft has a pair of elevators on its horizontal stabilizer and a servo for each of said elevators, said linkage means including a first link for interconnecting the outputs of said pair of elevator servos, said linkage means including a floating link connected to said interconnecting first link, a cross link interconnecting the other end of said floating link with said trim unit output, and a drive link extending from said cross link to the input of said second control means.

3. The combination of claim 2, at least two servos for said horizontal stabilizer, and a separate linkage extending from a common connection on said drive link to the input of each of said stabilizer servos.

4. The combination of claim 3, and bungee means in each of said horizontal stabilizer servo input linkages, and bungee means in said elevator servo control cable systems.

* * * * *